United States Patent Office 3,210,372

Patented Oct. 5, 1965

3,210,372
OXAZEPINES AND THIAZEPINES

Lincoln Harvey Werner, Summit, N.J., and Alberto Pietro Arnoldo Rossi, Oberwil, Basel-Land, Switzerland, assignors to Ciba Corporation, New York, N.Y., a corporation of Delaware No Drawing. Filed Mar. 26, 1963, Ser. No. 267,952
8 Claims. (Cl. 260—309.6)

This is a continuation-in-part application of our application Serial No. 227,713, filed October 2, 1962, which in turn is a continuation-in-part application of our application Serial No. 196,459, filed May 21, 1962, both now abandoned.

The present invention has for its object compounds containing the 10,11-dihydro - dibenzo[b,f][1,4]thiazepine or the 10,11-dihydro - dibenzo[b,f][1,4]oxazepine ring system of the following formula

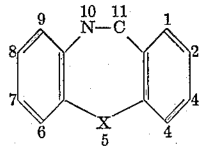

in which X is sulfur or oxygen.

More particularly, the invention relates to 10-(R-methyl)-10,11-dihydro - dibenzo[b,f][1,4]thiazepines and 10-(R-methyl)-10,11-dihydro - dibenzo[b,f] [1,4]oxazepines, in which R is a 2-(1,3-diaza-2-cycloalkenyl) radical having from five to eight ring members or the salts thereof, as well as process for the preparation of such compounds.

The compounds of this invention are especially those of the formula

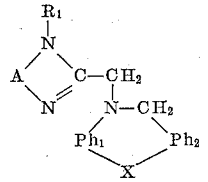

in which X has the previously given meaning, each of the groups $Ph_1$ and $Ph_2$ stands for a 1,2-phenylene (o-phenylene) radical, the group A is an alkylene radical separating the two nitrogen atoms by from two to five carbon atoms, and $R_1$ is hydrogen or an organic radical, or the salts thereof.

The two benzo portions of the 10,11-dihydro-dibenzo [b,f][1,4]thiazepine and the 10,11-dihydro-dibenzo[b,f] [1,4]oxazepine ring system, as represented in the above formula by the two 1,2-phenylene radicals $Ph_1$ and $Ph_2$, are unsubstituted or may carry one or more than one of the same or the difference substituents, which may be attached to any of the positions available for substitution. Such substituents are particularly lower alkyl, e.g., methyl, ethyl, n-propyl, isopropyl, n-butyl, isobutyl, secondary butyl, tertiary butyl and the like, etherified hydroxyl, primarily lower alkoxy, e.g., methoxy, ethoxy, n-propyloxy, isopropyl, n-butyloxy and the like, as well as lower alkenyloxy, e.g., allyloxy and the like, lower alkylenedioxy, e.g., methylenedioxy, 1,1-ethylenedioxy and the like, or any other etherified hydroxyl group, esterified hydroxyl, especially halogeno (representing hydroxyl esterified with a hyrohalic acid), e.g., fluoro, chloro, bromo and the like, or pseudonalogeno, such as halogeno-lower alkyl, e.g., trifluoromethyl and the like, as well as etherified mercapto, such as lower alkyl-mercapto, e.g., methylmercapto, ethylmercapto and the like, or any other etherified mercapto group, lower alkyl-sulfinyl, e.g., methylsulfinyl, ethylsulfinyl, and the like lower alkylsulfonyl, e.g., methylsulfonyl, ethylsulfonyl and the like, or acyl, such as lower alkanoyl, e.g., acetyl, propionyl, butyryl and the like, nitro, amino or N-substituted amino, such as N,N-di-lower alkyl-amino, e.g., N,N-dimethylamino, N,N-diethylamino and the like, or any other suitable substituent.

Benzo portions of the above tricyclic heterocyclic radicals, especially the 1,2-phenylene groups $Ph_1$ and $Ph_2$ in the above formula, are particularly benzo portions, especially 1,2-phenylene radicals, or substituted benzo portions, especially substituted 1,2-phenylene radicals, such as (lower alkyl)-benzo portions, especially (lower-alkyl)-1,2-phenylene radicals, such as (methyl)-benzo portions, especially (methyl)-1,2 - phenylene radicals, (ethyl)-benzo portions, especially (ethyl)-1,2-phenylene radicals and the like, (etherified hydroxy)-benzo portions, especially (etherified hydroxy)-1,2 - phenylene radicals, particularly (lower alkoxy)-benzo portions, especially (lower alkoxy)-1,2-phenylene radicals, such as (methoxy)-benzo portions, especially (methoxy)-1,2-phenylene radicals and the like, as well as (lower alkenyloxy)-benzo portions, especially (lower alkenyloxy)-1,2 - phenylene radicals, or (lower alklenedioxy)-benzo portions, especially (lower alkylenedioxy)-1,2-phenylene radicals, (esterified hydroxy)-benzo portions, especially (esterified hydroxy)-1,2-phenylene radicals, particularly (halogeno)-benzo portions, especially (halogeno)-1,2-phenylene radicals, such as (fluoro),benzo portions, especially (fluoro)-1,2-phenylene radicals, (chloro)-benzo portions, especially (chloro)-1,2-phenylene radicals and the like, or (halogeno-lower alkyl)-benzo portions, especially (halogeno-lower alkyl)-1,2-phenylene radicals, such as (trifluoromethyl)-benzo portions, especially (trifluoromethyl)-1,2-phenylene radicals, as well as (etherified mercapto)-benzo portions, especially (etherified mercapto)-1,2-phenylene radicals, such as (lower alkyl-mercapto)-benzo portions, especially (lower alkyl-mercapto)-1,2 - phenylene radicals, (S-substituted sulfinyl)-benzo portions, especially (S-substituted sulfinyl)-1,2-phenylene radicals, such as (S-lower alkyl-sulfinyl)-benzo portions, especially (S-lower alkyl-sulfinyl)-1,2-phenylene radicals, (S - substituted sulfonyl)-benzo portions, especially (S-substituted sulfonyl)-1,2-phenylene radicals, such as (S-lower alkyl-sulfonyl)-benzo portions, especially (S-lower alkyl-sulfonyl)-1,2-phenylene radicals, (acyl)-benzo portions, especially (acyl)-1,2-phenylene radicals, such as (lower alkanoyl)-benzo portions, especially (lower alkanoyl)-1,2-phenylene radicals, (nitro)-benzo portions, especially (nitro)-1,2-phenylene radicals, (N-substituted amino)-benzo portions, especially (N-substituted amino)-1,2-phenylene radicals, such as (N,N-di-lower alkyl-amino)-benzo portions, especially (N,N-di-lower alkyl-amino)-1,2-phenylene radicals and the like, or any other substituted benzo portions, especially substituted 1,2-phenylene radicals.

The 2-(1,3-diaza-2-cycloalkenyl) radical R having from five to eight ring members represented in the above formula by the partial formula

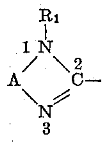

is more particularly a 2-imidazolin-2-yl radical or a 2-(1,4,5,6-tetrahydro-pyrimidyl) radical, as well as a 2-(1,3-diaza-2-cyclo-heptenyl) radical or a 2-(1,3-diaza-2-cyclo-octenyl) radical. The carbon atoms of the 2-(1,3-aza-2-cycloalkenyl) radical available for substitution are either unsubstituted or may contain one or more than one substituent, especially lower alkyl, e.g., methyl, ethyl, n-propyl, isopropyl, n-butyl, tertiary butyl and the like or any other suitable substituent. One of the aza-nitrogens carries a hydrogen atom, which, if desired, may be replaced by an organic radical, particularly an aliphatic radical, such as lower alkyl, e.g., methyl, ethyl, n-propyl, ispropyl, n-butyl, secondary butyl, tertiary butyl and the like or any other suitable aliphatic substituent, for example, lower alkenyl, e.g., allyl, 2-methylallyl, 2-butenyl and the like, cycloaliphatic substituent, such as cycloalkyl having from three to eight, preferably from five to seven, ring carbon atoms, e.g., cyclopropyl, cyclopentyl, cyclohexyl, cycloheptyl and the like, or substituted aliphatic radical, such as cycloalkyl-lower alkyl, in which cycloalkyl has from three to eight, preferably from five to seven, ring carbon atoms, e.g., cyclopropylmethyl, cyclopentylmethyl, 2-cyclopentylethyl, cyclohexylmethyl, 1-cyclohexylethyl, cycloheptylmethyl and the like, carbocyclic aryl-lower alkyl, such as phenyl-lower alkyl, e.g., benzyl, 1-phenylethyl, 2-phenylethyl and the like, heterocyclic aryl-lower alkyl, such as pyridyl-lower alkyl, e.g., 2-pyridylmethyl and the like, or any other equivalent substituent, such as carbocyclic aryl, e.g., phenyl and the like, heterocyclic aryl, e.g., pyridyl and the like.

Thus, in the above partial formula, the group A stands for lower alkylene separating the two nitrogen atoms by from two to five carbon atoms, which may be unsubstituted or substituted, especially by lower alkyl; A is, therefore, represented by 1,2-ethylene, 1-methyl-1,2-ethylene, 2-methyl-1,2-ethylene, 1,1-dimethyl-1,2 - ethylene, 1,2-dimethyl-1,2-ethylene, 1-ethyl-1,2 - ethylene, 1 - isopropyl-1,2-ethylene, 1,3-propylene, 1-methyl-1,3-propylene, 2-methyl-1,3-propylene, 1,2-dimethyl-1,3 - propylene, 2,2 dimethyl-1,3-propylene, 1,3-dimethyl-1,3 - propylene, 1-ethyl-1,3-propylene, 2-isopropyl - 1,3 - propylene, 1,4-butylene, 1-methyl-1,4-butylene, 1,2-dimethyl-1,4-butylene, 1-n-propyl-1,4-butylene and the like. The group $R_1$ in the partial formula is hydrogen or may be one of the above organic radicals, particularly lower alkyl, as well as lower alkenyl, cycloalkyl, cycloalkyl-lower alkyl, carbocyclic aryl-lower alkyl, heterocyclic aryl-lower alkyl, carbocyclic aryl, or heterocyclic aryl.

Salts of the compounds of this invention are acid addition salts, such as the pharmaceutically useful, non-toxic, acid addition salts with inorganic acids, e.g., hydrochloric, hydrobromic, sulfuric, phosphoric acids and the like, or with organic acids, such as organic carboxylic acids, e.g., formic, acetic, propionic, glycolic, malonic, succinic, maleic, hydroxymaleic, fumaric, malic, tartaric, citric, benzoic, salicyclic, 2-acetoxy-benzoic, nicotinic, isonicotinic acid and the like, or organic sulfonic acids, e.g., methane sulfonic, ethane sulfonic, 2-hydroxyethane sulfonic, ethane 1,2-disulfonic, benzene sulfonic, p-toluene sulfonic, naphthalene 2-sulfonic acid and the like. Other acid addition salts may be used as intermediates, for example, in the purification of the free compounds or in the preparation of other, for example, pharmaceutically acceptable acid addition salts, or for identification and characterization purposes. Acid addition salts primarily used for identification purposes are, for example, those with acidic organic nitro compounds, e.g., picric, picrolonic, flavianic acid and the like, or with metal complex acids, e.g., phosphotungstic, phosphomolybdic, chloroplatinic, Reinecke acid and the like. Mono- or poly-salts may be formed depending on the procedure used for the preparation of the salts.

The new compounds of this invention have antifibrillatory properties and can, therefore, be used in the treatment of neurogenic or cardiogenic, auricular or ventricular fibrillation. They also show antihistaminic and local anesthetic effects and can, therefore, be used accordingly, i.e., as antihistaminic or local anesthetic agents. The above pharmacological effects, particularly the antifibrillatory properties, exhibited by the compounds of this invention are of prolonged duration.

Outstanding pharmacological properties are exhibited by compounds having the formula

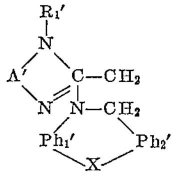

in which X has the previously given meaning, each of the groups $Ph_1'$ and $Ph_2'$ is 1,2-phenylene, (lower alkyl)-1,2-phenylene, (lower alkoxy)-1,2-phenylene, (halogeno)-1,2-phenylene or (trifluoromethyl)-1,2-phenylene, A' stands for alkylene having from two to five carbon atoms and separating the two nitrogen atoms by from two to three carbon atoms, $R_1'$ is hydrogen or lower alkyl, or acid addition salts thereof. This group of compounds is represented by those having the following formulae

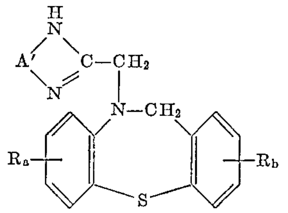

and

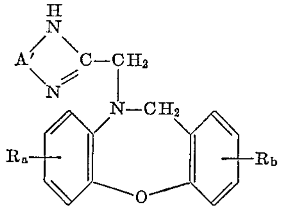

in which each of the groups $R_a$ and $R_b$ is hydrogen, lower alkyl, halogeno or trifluoromethyl, and A' has the previous given meaning, and the acid additions salts of these compounds.

The compounds of this invention may be used in the form of compositions for enteral or parenteral use, which contain the new compounds in admixture with an organic or inorganic, solid or liquid carrier. For making up the compositions there can be employed substances which do not react with the new compounds, such as water, gelatine, lactose, starches, stearic acid, magnesium stearate talc, vegetable oils, benzyl alcohol, stearyl alcohol, gums, propylene glycol, polyalkylene glycols or any other carrier suitable for such compositions. The latter may be in solid form, for example, as capsules, tablets, dragees and the like, or in liquid form, for example, as solutions, suspension, emulsions and the like. If desired, they may contain auxiliary substances, such as preserving, stabilizing, wetting, emulsifying, coloring, flavoring agents and the like, salts for varying the osmotic pressure, buffers, etc. They may also contain, in combination, other useful substances.

The compounds of the present invention can be prepared by known methods, for example, by treating a 10,11-dihydrodibenzo[b,f][1,4]thiazepine or a 10,11-dihydro-dibenzo[f,b][1,4]oxazepine, or a salt thereof, with a reactive ester of an R-methanol, in which R stands for the above 2-(1,3-diaza-2-cycloalkenyl) radical having from five to eight ring members, or a salt thereof, and, if desired, converting a resulting salt into the free compound or into another salt, and/or, if desired, replacing a hydrogen atom attached to one of the aza-nitrogen atoms of the 2-(1,3-diaza-2-cycloalkenyl) radical in a resulting compound by an organic radical, and/or, if desired, converting a free compound into a salt thereof, and/or, if desired, separating a resulting mixture of isomers into the single isomers according to known methods.

A salt of the starting material used in the above procedure is a metal salt, particularly the alkali metal, e.g., lithium, sodium or potasium, salt, as well as the alkaline earth metal salt thereof, or any other equivalent salt, such as the one formed with a strong ammonium base, for example, benzyl trimethyl ammonium hydroxide and the like. These salts are prepared according to known methods, for example, by reacting the free compound with a metal, such as an alkali metal, or, more especially, with an alkali metal hydride, amide or lower alcoholate, e.g., methanolate, ethanolate, tetriary butanolate and the like, in the presence of an appropriate diluent. The resulting salts of the starting material are preferably used with the free reactive ester of the R-methanol.

The reactive esterified R-methanol reagent used in the above procedure is, for example, the ester of methanol with a strong inorganic acid, such as a mineral acid, for example, a hydrohalic acid, e.g., hydrochloric, hydrobromic, hydriodic acid, or sulfuric acid, or with a strong organic acid, particularly a strong organic sulfonic acid, such as a lower alkane or monocyclic carbocyclic aryl sulfonic acid, e.g., methane sulfonic, ethane sulfonic, 2-hydroxy-ethane sulfonic, p-toluene sulfonic acid and the like. Salts of the reactive esters of an R-methanol are addition salts with acids, such as those mentioned hereinfore, particularly the hydrohalic acids; these acid addition salts are preferably used with the free starting materials.

As mentioned before, the reaction is carried out in such manner that only one of the reactants is used in the form of its salt, and is preferably performed in the presence of a diluent the selection of which depends on the properties of the reagents; thus, lower alkanols, e.g., methanol, ethanol and the like, may be used with the free 10,11-dihydro-dibenzo[b,f][1,4]thiazepine or 10,11-dihydro-dibenzo[b,f][1,4]oxazepine, whereas a salt of the latter may be reacted in the presence of an inert solvent, such as ethers, e.g., diethyl ether, p-dioxane, tetrahydrofuran and the like, hydrocarbons, e.g., hexane, cyclohexane, benzene, toluene and the like, N,N-disubstituted amides, e.g., N,N,-dimethylformamide and the like, or any suitable diluent or solvent mixture. If necessary, the reaction may be carried out while cooling or at an elevated temperature, in a closed vessel and/or in the atmosphere of an inert gas, e.g. nitrogen.

The starting materials used in the above reaction are known or may be prepared according to known methods. For example, intermolecular condensation of 2-amino-diphenyl-sulfide 2'-carboxylic acids and 2-amino-diphenyl ether 2'-carboxylic acids, respectively, or an ester, such as a lower alkyl ester, thereof at an elevated temperature and in the absence of an acid condensation agent yields 11-oxo-10,11-dihydro-dibenzo[b,f][1,4]thiazepines or 11-oxo-10,11-dihydro-dibenzo[b,f][1,4]oxazepines. These 11-oxo-compounds may then be converted into the desired 10,11-dihydro-dibenzo[b,f][1,4]thiazepine and 10,11-dihydro-dibenzo[b,f][1,4]oxazepine compound, for example, by treatment with a suitable dilight metal hydride, e.g. lithium aluminum hydride and the like, or any other suitable reducing reagent.

The reactive esters of R-methanol compounds may be prepared, for example, by treating an R-methanol with an esterfying agent, such as a thionyl halide, e.g., thionyl chloride and the like, or an organic sulfonic acid halide, e.g., p-toluene sulfonyl chloride and the like.

The compounds of this invention may also be prepared by converting a 10-{10,11-dihydro-dibenzo[b,f][1,4]thiazepinyl}-acetic acid or a 10-{10,11-dihydro-dibenzo[b,f][1,4]oxazepinyl}-acetic acid, or a functional acid derivative thereof, into the 10-(R-methyl)-10,11-dihydro-dibenzo [b,f][1,4]thiazepine or 10-(R-methyl)-10,11-dihydro-dibenzo[b,f][1,4]oxazepine, respectively, in which R has the previously-given meaning, and, if desired, carrying out the optional steps.

The starting materials used in the above reaction are preferably the functional acid derivatives of the above acetic acid starting material, primarily nitrogen-containing functional acid derivatives, particularly the nitriles thereof; the above conversion is, therefore, preferably carried out using a 10-{10,11-dihydro-dibenzo[b,f][1,4]thiazepinyl}-acetonitrile or a 10-{10,11-dihydro-dibenzo[b,f][1,4]oxazepinyl}-acetonitrile as the starting material. Other suitable nitrogen-containing functional acid derivatives are the imino-ethers, the imino-thioethers, the imino-halides, the amidines, the amides, the thioamides or any other suitable nitrogen-containing functional acid derivatives thereof, as well as non-nitrogenous functional acid derivatives, such as esters, acid halides and the like.

Generally, the conversion of the carboxyl group in the starting material, or of the functional acid derivative thereof, into the group R, is achieved by treating the starting material with an alkylene diamine, in which the two amino groups are separated by from two to five carbon atoms, or with a reactive N-substituted derivative of such alkylene diamine, or with a compound capable of being converted into the alkylene diamine. The desired ring formation is carried out directly or in stages, if necessary, in the presence of a reactant; furthermore, the process may be performed in such manner that a functional acid derivative is formed in the course of the reaction.

The above reaction is carried out according to known methods, the selection of which depends primarily on the reagents used. Thus, when a nitrile is directly reacted with the alkylene diamine, such reaction is preferably performed in the presence of hydrogen sulfide or a reagent furnishing the latter, such as carbon disulfide and the like; in such reaction the alkylene diamine may be used in the form of a mono- or bis-acid addition salt thereof. Other functional acid derivatives of the acetic acids used as the starting materials are reacted accordingly with the alkylene diamine reagent. N-substituted derivatives of the alkylene diamine capable of being used in the above conversion are, for example, alkylene ureas, in which alkylene separates the two urea-nitrogen atoms by from two to five carbon atoms, such as, for example, ethyleneurea, propyleneurea and the like. Compounds capable of being converted into the desired alkylene diamine reagents are, for example, amino-alkanols or reactive esters thereof, in which the amino and the hydroxyl or esterified hydroxyl group are separated by from two to five carbon atoms, or suitable alkylene halides, eg., chlorides, bromides and the like, in which the two halogeno atoms are separated by from two to five carbon atoms; these reagents are used in the presence of ammonia or a reagent yielding the latter.

If desired, the above conversion reaction may be carried out in stages; for example, the acetic acid starting material may first be converted into a functional derivative thereof, or a functional derivative of the acetic acid compound may be transformed into another functional derivative thereof, and the resulting intermediate may then react with the proper alkylene-diamine reagent to yield the desired product. Or, the 10-{10,11-dihydrodibenzo[b,f][1,4]thiazepinyl}-acetic acid or the 10-{10,11-dihydrodibenzo[b,f][1,4]oxazepinyl}-acetic acid or a functional acid derivative thereof is reacted with the alkylene diamine to form first the corresponding N-acylated alkylene diamine, and the desired group R is then formed by dehydration, for example, by treatment with calcium oxide and the like, or desulfurization, for example, with a heavy metal oxide, e.g., lead oxide and the like, or any other suitable reagent.

The conditions of the reaction itself may differ and depend on the selected starting materials. The conversion may occur in the absence or presence of a diluent and/or a condensing reagent, if necessary, while cooling or at an elevated temperature, in a closed vessel, in the atmosphere of an inert gas, and/or while removing by-products, such as azeotropically distilling water.

The starting materials used in the above reaction are new and are intended to be included within the scope of this invention. They are primarily the compounds of the formula

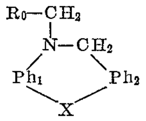

in which $Ph_1$, $Ph_2$ and X have the previously given meaning, and $R_0$ stands for one of the groups of the formula —C≡N, —C=NH(O-lower alkyl), —C=NH(S-lower alkyl), —C=NH(Hal), in which Hal stands for halogeno, e.g., chloro, bromo and the like, —C=NH(NH—$R_1$), in which $R_1$ has the previously given meaning, i.e., is hydrogen or an organic radical, particularly lower alkyl, —C=O(NH—$R_1$), —C=S(NH—$R_1$), —C=O(O-lower alkyl) or —C=O(Hal).

These intermediates are represented by the compounds of the formula

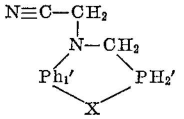

in which $Ph_1'$, $Ph_2'$ and X have the previously given meaning, more especially by those of the formulae

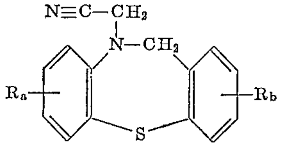

and

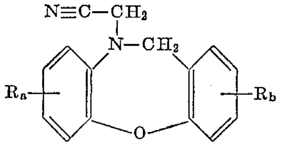

in which $R_a$ and $R_b$ have the previously given meaning.

These compounds may be prepared according to known methods. For example, a 10,11-dihydro-dibenzo[b,f][1,4]thiazepine or a 10,11-dihydro-dibenzo[b,f][1,4]oxazepine, preferably a metal, such as an alkali metal, e.g., sodium, potassium and the like, salt thereof, may be reacted with a reactive ester of hydroxy-acetic acid, such as a halogeno-acetic acid or a functional acid derivative thereof, or a 10,11-dihydro-dibenzo[b,f][1,4]thiazepine or a 10,11-dihydro-dibenzo[b,f][1,4]oxazepine may be reacted with formaldehyde or a reactive derivative thereof, e.g., paraformaldehyde and the like, in the presence of hydrogen cyanide or a reagent furnishing hydrogen cyanide, according to the reaction known as the Strecker synthesis. In any resulting compound, the free carboxyl group or a functionally converted carboxyl group, such as the cyano group and the like, may be converted into a functionally converted acid group, and into the free carboxyl group or another functionally converted carboxyl group, respectively, according to methods known in themselves.

In a resulting compound, in which one of the nitrogen atoms of the 2-(1,3-diazo-2-cycloalkenyl) radical carries a hydrogen, such hydrogen may be replaced by an organic radical, especially an aliphatic radical, such as lower alkyl and the like, according to known methods; for example, the N-unsubstituted compound or a salt thereof, such as an alkali metal salt, may be reacted with a reactive ester of an alcohol, such as a lower alkyl halide, e.g., methyl, ethyl, n-propyl or isopropyl chloride, bromide or iodide and the like, a di-lower alkyl sulfate, e.g., dimethyl sulfate, diethyl sulfate and the like, or a lower alkyl sulfonate, e.g., methyl or ethyl methane sulfonate or p-toluene sulfonate and the like, according to previously mentioned procedures.

The invention also comprises any modification of the process wherein a compound formed as an intermediate at any stage of the process, is used as starting material and the remaining step(s) of the process is (are) carried out, or the process is discontinued at any stage, or in which the starting materials are formed in the course of the reaction. Also included within the scope of the present invention are any new intermediates, such as, for example, those mentioned hereinbefore.

The following examples are intended to illustrate the invention and are not to be construed as being limitations thereof. Temperatures are given in degrees centigrade.

*Example 1*

A mixture of 7.7 g. of 10-cyanomethyl-10,11-dihydro-dibenzo[b,f][1,4]thiazepine, 2.2 g. of ethylene diamine and three drops of carbon disulfide is heated for seven hours at 130–135° under an atmosphere of nitrogen. After the ammonia evolution ceases, the reaction mixture is dissolved in 50 ml. of ethyl acetate, the solution is treated with a charcoal preparation and then with a solution of dry hydrogen chloride in ethyl acetate. The resulting precipitate is filtered off and dissolved in water; the aqueous solution is made basic with 2 N aqueous sodium hydroxide and extracted with diethyl ether. The desired 10-[(2-imidazolin-2-yl)-methyl]-10,11-dihydro-dibenzo[b,f][1,4]thiazepine of the formula

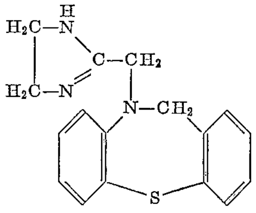

is obtained by evaporating the solvent and recrystallizing the residue from a mixture of ethyl acetate and petroleum ether, M.P. 96–98°. The hydrochloride, prepared by treating an ethanol solution of the free base with a solution of dry hydrogen chloride in ethyl acetate and precipitating the salt by adding ethyl acetate, melts at 236–238° after recrystallization from a mixture of ethanol and ethyl acetate.

The starting material used in the above reaction is prepared as follows: To a suspension of 45 g. of lithium aluminum hydride in 1800 ml. of dry p-dioxane is added in portions, while stirring and over a period of one hour 113.5 g. of 11-oxo-10,11-dihydro-dibenzo[b,f][1,4]thiazepine; the temperature during the addition is maintained at 60°. The reaction mixture is refluxed for one hour, then cooled at 10° and treated carefully with 250 ml. of water while cooling with ice. The solid material is filtered off, washed with ethyl acetate, and the combined filtrates are evaporated to dryness. The residue is dissovled in 1000 ml. of diethyl ether; the organic solution is washed with 120 ml. of a 2 N aqueous solution of sodium hydroxide and with two portions of 200 ml. of water, dried over magnesium sulfate and evaporated to yield the desired 10,11-dihydro-dibenzo[b,f][1,4]thiazepine which is purified by recrystallization from a mixture of ethyl acetate and petroleum ether, M.P. 114–115°.

To a suspension of 8.0 g. of 10,11-dihydro-dibenzo[b,f][1,4]thiazepine in 18 ml. of glacial acetic acid is added 1.13 g. of paraformaldehyde; the mixture is cooled to 15° and treated while stirring with a solution of 2.76 g. of sodium cyanide in 10 ml. of water over a period of 45 minutes. The reaction mixture is stirred for one hour at 15°, one hour at room temperature and eight hours at 50°, and is then cooled to 40°, at which temperature 1.7 ml. of a 37 percent aqueous solution of formaldehyde is added. Stirring is continued for one hour; the reaction mixture is cooled to room temperature and diluted with 5 ml. of water. The aqueous solution is decanted from the oily material, which is dissolved in diethyl ether; the organic solution is washed with a saturated solution of sodium hydrogen carbonate and with water and is evaporated. The desired 10-cyanomethyl-10,11-dihydro-dibenzo[b,f][1,4]thiazepine of the formula

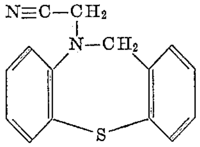

is purified by distilling the residue, B.P. 160–165°/0.08 mm.

*Example 2*

A mixture of 10.65 g. of 10,11-dihydro-dibenzo[b,f][1,4]thiazepine in 65 ml. of p-dioxane and 2.55 g. of sodium amide is heated to reflux for one hour. A solution of 7.7 g. of 2-(chloromethyl)-2-imidazoline in 20 ml. of toluene is added dropwise to the reaction mixture while maintaining a temperature of 80°. The temperature is then raised to boiling and maintained for one hour; after cooling, 5 ml. of ethanol is added, the solid material is filtered off, and the filtrate evaporated under reduced pressure. The residue is taken up in diethyl ether, and the desired 10-[(2-imidazolin-2-yl)-methyl] 10,11-dihydro-dibenzo[b,f][1,4]thiazepine is extracted with dilute sulfuric acid. The acid solution is made basic with sodium hydroxide and the free compound is extracted with diethyl ether; the residue is recrystallized from a mixture of ethyl acetate and petroleum ether, M.P. 96–98°. The maleate is prepared according to the procedure described in Example 1.

*Example 3*

A mixture of 5.5 g. of 8-methyl-10-cyanomethyl-10,11-dihydro-dibenzo[b,f][1,4]thiazepine, 1.5 g. of ethylene diamine and three drops of carbon disulfide is heated for six hours to 130–140° under an atmosphere of nitrogen. After the ammonia evolution ceases, the reaction mixture is dissolved in ethanol, the solvent is evaporated under reduced pressure and the residue is dissolved in 100 ml. of ethyl acetate. The solution is treated with dry hydrogen chloride in ethanol, the resulting salt is filtered off, and dissolved in water; the aqueous solution is treated with charcoal and then made alkaline with 10 percent aqueous sodium hydroxide. The organic material is extracted with diethyl ether; the organic solution is washed with water, dried over magnesium sulfate and evaporated to dryness. The residue is dissolved in ethanol, treated with an ethanol solution of hydrogen chloride, and the 10-[(2-imidazolin-2-yl)-methyl] - 8-methyl-10,11 - dihydro-dibenzo[b,f][1,4]thiazepine hydrochloride of the formula

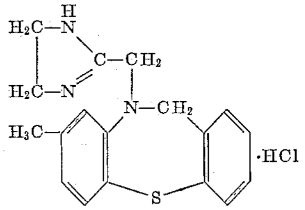

precipitates by diluting the solution with ethyl acetate, M.P. 247–249° (with decomposition), and is recrystallized from a mixture of ethanol and ethyl acetate.

The starting material used in the above procedure may be prepared as follows: To a suspension of 7.0 g. of 8-methyl-10,11-dihydro - dibenzo[b,f][1,4]thiazepine in 15 ml. of ethyl acetate is treated with 0.95 g. of paraformaldehyde. While stirring and cooling to 10–15°, a solution of 1.9 g. of sodium cyanide in 6 ml. of water is added over a period of thirty minutes, and stirring is continued for one hour at 15°, one hour at 25° and eight hours at 50°. After cooling to 40°, 1.4 ml. of a 37 percent aqueous solution of formaldehyde is added, and the mixture is stirred at that temperature for an additional hour. After cooling to 10°, the reaction mixture is treated with 15 ml. of water, the aqueous solution is decanted from the oily product, which is dissolved in diethyl ether. The organic solution is washed with a saturated aqueous solution of sodium hydrogen carbonate and evaporated; the desired 10-cyanomethyl-8-methyl-10,11-dihydro-dibenzo[b,f][1,4]thiazepine of the formula

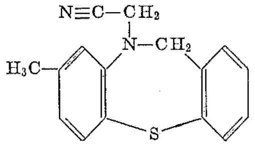

is isolated by distilling the residue, B.P. 155–165°/0.15 mm.

Other compounds, which may be prepared according to the above procedure by selecting the appropriate starting materials are, for example, 10-[(3-methyl-2-imidazolin-2-yl)-methyl]-10,11-dihydro-dibenzo[b,f][1,4]thiazepine,
10-[(1,4,5,6-tetrahydro-2-pyrimidyl)-methyl]-10,11-dihydro-dibenzo[b,f][1,4]thiazepine,
6-chloro-10-[(2-imidazolin-2-yl)-methyl]-10,11-dihydro-dibenzo[b,f][1,4]thiazepine,
7-chloro-10-[(2-imidazolin-2-yl)-methyl]-10,11-dihydro-dibenzo[b,f][1,4]thiazepine,
8-chloro-10-[(2-imidazolin-2-yl)-methyl]-10,11-dihydro-dibenzo[b,f][1,4]thiazepine,
7,8-dichloro-10-[(2-imidazolin-2-yl)-methyl]-10,11-dihydro-dibenzo[b,f][1,4]thiazepine,
8-fluoro-10-[(2-imidazolin-2-yl)-methyl]-10,11-dihydro-dibenzo[b,f][1,4]thiazepine,
7-bromo-10-[(2-imidazolin-2-yl)-methyl]-10,11-dihydro-dibenzo[b,f][1,4]thiazepine,
10-[(2-imidazolin-2-yl)-methyl]-6-methyl-10,11-dihydro-dibenzo[b,f][1,4]thiazepine,
10-[2-imidazolin-2-yl)-methyl]-7-methyl-10,11,dihydro-dibenzo[b,f][1,4]thiazepine,
7,8-dimethyl-10-[(2-imidazolin-2-yl)-methyl]-10,11-dihydro-dibenzo[b,f][1,4]thiazepine,
10-[(2-imidazolin-2-yl)-methyl]-8-methoxy-10,11-dihydro-dibenzo[b,f][1,4]thiazepine,
10-[2-imidazolin-2-yl)-methyl]-8-trifluoromethyl-10,11-dihydro-dibenzo[b,f][1,4]thiazepine,
10-[(1,3-diaza-2-cyclohepten-2-yl)-methyl]-10,11-dihydro-dibenzo[b,f][1,4]thiazepine and the like.

*Example 4*

A mixture of 3.7 g. of 10-cyanomethyl-10,11-dihydro-dibenzo[b,f][1,4]oxazepine, 1.15 g. of ethylenediamine and two drops of carbon disulfide is heated for six hours at 130–135° under an atmosphere of nitrogen. The resulting mixture is dissolved in 50 ml. of ethanol, the solvent is evaporated and the residue is taken up in 70 ml. of ethyl acetate. After filtration, a solution of dry hydrogen chloride in ethanol is added, the crude hydrochloride salt is filtered off and dissolved in water. The aqueous solution is treated with a charcoal preparation and then made alkaline with a 10 percent aqueous solution of sodium hydroxide; the oily organic material is extracted with ethyl acetate, and the organic solution is washed with water, dried over magnesium sulfate and evaporated. The residue is dissolved in ethanol and treated with the calculated amount of hydrogen chloride in ethanol. The desired 10-[2-imidazolin-2-yl)-methyl]-10,11-dihydro-dibenzo[b,f][1,4]oxazepine hydrochloride of the formula

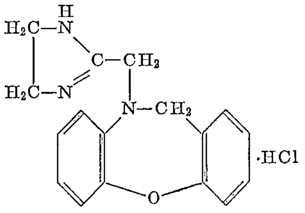

is precipitated by adding ethyl acetate and diethyl ether and is recrystallized from a mixture of ethanol and diethyl ether, M.P. 240–242° (with decomposition).

The starting material used in the above example is prepared as follows: A mixture of 50.0 g. of 2-nitro-bromobenzene, 38.0 g. of o-cresol, 16.5 g. of potassium hydroxide and 0.1 g. of copper is heated to 130–140°. After cooling, 50 ml. of water and 100 ml. of diethyl ether are added, the solid material is filtered off and an additional amount of 200 ml. of diethyl ether and 100 ml. of water are added. The organic phase is washed with a 10 percent aqueous solution of potassium hydroxide, twice with water, dried over magnesium sulfate and evaporated to dryness. The 2-nitro-2'-methyl-diphenyl ether is purified by distilling the residue, B.P. 148–151°/1 mm.

A solution of 29.0 g. of 2-nitro-2'-methyl-diphenyl ether in 240 ml. of pyridine is heated to 95° while stirring; a hot solution of 91.0 g. of potassium permanganate in 455 ml. of water is added over a period of thirty minutes. After stirring at 90° for one hour, the reaction mixture is filtered hot; the filtrate is concentrated to a volume of about 200 ml., extracted with diethyl ether and diluted with about 100 ml. of water and acidified with concentrated hydrochloric acid. The solid material is filtered off and dissolved in ethyl acetate; the solution is dried over sodium sulfate and evaporated. The white, crystalline 2-nitro-diphenyl ether 2'-carboxylic acid melts at 154–156°.

A solution of 15.0 g. of 2-nitrogen-diphenyl ether 2'-carboxylic acid in 800 ml. of methanol, containing 4 g. of concentrated sulfuric acid, is refluxed for four hours; the methanol is then evaporated under reduced pressure and ice is added to the residue. The aqueous mixture is extracted with diethyl ether; the ether extract is washed with a 5 percent aqueous solution of sodium hydroxide and water, dried over magnesium sulfate and evaporated. The desired methyl 2-nitro-diphenyl ether 2'-carboxylate is crystallized from a mixture of diethyl ether and petroleum ether, M.P. 49–50°.

A solution of 12.0 g. of methyl 2-nitro-diphenyl ether 2'-carboxylate in 100 ml. of ethyl acetate is hydrogenated in the presence of 5.0 g. of Raney nickel. After the theoretical uptake of about 3000 ml. of hydrogen, the hydrogenation is interrupted, the solvent is evaporated and the oily methyl 2-amino-diphenyl ether 2'-carboxylate, which solidifies upon standing, is used without further purification.

10.2 g. of methyl 2-amino-diphenyl ether 2'-carboxylate is heated to 220–225° under an atmosphere of nitrogen for 2½ hours, and at 200° under reduced pressure for 1½ hours. The solid 11-oxo-10,11-dihydro-dibenzo[b,f][1,4]oxazepine is crystallized from ethanol and a small amount of petroleum ether, M.P. 222–224°.

To a suspension of 3.5 g. of lithium aluminum hydride in 150 ml. of tetrahydrofuran, held at 60°, is added 5.7 g. of 11 - oxo - 10,11-dihydro-dibenzo[b,f][1,4]oxazepine over a period of ten minutes while stirring; the latter is maintained for four hours. The reaction mixture is allowed to stand at room temperature overnight and then cooled in an ice-bath; 13.5 ml. of water is added over a period of one hour and the mixture is refluxed for one hour. The inorganic material is filtered off, washed with methylene chloride, and the organic filtrates are evaporated under reduced pressure. The residue is dissolved in ethyl acetate, washed with a saturated solution of sodium carbonate in water, and water, and evaporated. The 10,11-dihydro-dibenzo[b,f][1,4]oxazepine is obtained by recrystallizing the residue from a mixture of diethyl ether and petroleum ether, M.P. 75–76.5°.

To a solution of 4.25 g. of 10,11-dihydro-dibenzo[b,f][1,4]oxazepine in 20 ml. of glacial acetic acid is added 0.65 g. of paraformaldehyde; the reaction mixture is then treated over a period of fifteen minutes with a solution of 1.3 g. of sodium cyanide in 4 ml. of water while stirring and cooling to 15°. Stirring is continued for one hour at that temperature, for one hour at 25° and eight hours at 50°; the reaction mixture is cooled to 40° and treated with a 37 percent aqueous formaldehyde solution. After stirring for one hour at 40°, the temperature is brought to 10°, 20 ml. of water is added, the aqueous solution is decanted, and the oily residue is dissolved in diethyl ether. The organic solution is washed with a saturated aqueous solution of sodium hydrogen carbonate, dried over magnesium sulfate and evaporated under reduced pressure. The desired 10-cyanomethyl-10,11-dihydro-dibenzo[b,f][1,4]oxazepine is purified by distillation, B.P. 135–140°/0.1 mm.

Other compounds, which may be prepared according to the above procedure are, for example, 10-[(1,4,5,6-tetrahydro-2-pyrimidyl)-methyl]-10,11-dihydro - dibenzo[b,f][1,4]oxazepine, 10 - [(4-methyl-2-imidazolin-2-yl-)methyl] - 10,11 - dihydro-dibenzo[b,f][1,4]oxazepine, 10-[(2-imidazolin-2-yl)-methyl]-8-methyl-10,11-dihydro - dibenzo[b,f][1,4]oxazepine, 6-chloro-10-[(2-imidazolin-2-yl)-methyl] - 10,11 - dihydro-dibenzo[b,f][1,4]oxazepine, 8-chloro - 10 - [(3-methyl-2-imidazolin-2-yl)-methyl]-10,11 - dihydro - dibenzo[b,f][1,4]oxazepine, 10-[(2-imidazolin - 2 - yl)-methyl]-8-methoxy-10,11-dihydro-dibenzo[b,f][1,4]oxazepine, 10-[(imidazolin - 2 - yl)-methyl]-8-ethyl-10,11-dihydro-dibenzo[b,f][1,4]oxazepine, 10-[(1-ethyl - 1,4,5,6 - tetrahydro-2-pyrimidyl)-methyl]-10,11-dihydro - dibenzo[b,f][1,4]oxazepine, 10-[(2-imidazolin-2-yl)-methyl] - 8 - trifluoromethyl-10,11-dihydro-dibenzo[b,f][1,4]oxazepine and the like.

*Example 5*

A mixture of 6.0 g. of 7-chloro-10-cyanomethyl-2-methyl-10,11-dihydro-dibenzo[b,f][1,4]thiazepine, 1.8 g. of anhydrous ethylene diamine and four drops of carbon disulfide is heated to 110–135° for 4½ hours. The reaction mixture solidifies, is cooled and then diluted with ethanol. The solution is evaporated to dryness; the residue is dissolved in ethyl acetate and the insoluble material is filtered off. On cooling the filtrate, the desired 7-chloro-10-[(2-imidazolin-2-yl)-methyl] - 2 - methyl-10,11-dihydrodibenzo[b,f][1,4]thiazepine of the formula:

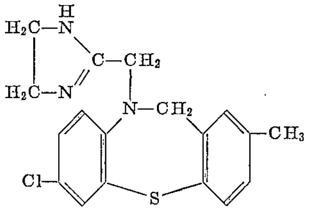

crystallizes and is filtered off; yield: 3.0 g. It melts at 158–161° after recrystallization from ethanol. A solution of the base in isopropanol, when treated with a solution of hydrogen chloride in ethyl acetate, yields the 7-chloro-10-[(2-imidazolin-2-yl) - methyl]-2 - methyl-10,11-dihydro-dibenzo[b,f][1,4]thiazepine hydrochloride, M.P.>270° after recrystallization from ethanol.

The starting material used in the above procedure is prepared as follows: To a suspension of 5.6 g. of lithium aluminum hydride in 400 ml. of tetrahydrofuran is added over a period of one hour 22.0 g. of 7-chloro-2-methyl-11-oxo-10,11 - dihydro-dibenzo[b,f][1,4]thiazepine. The reaction mixture is stirred at room temperature for three hours, then refluxed gently for four hours and stirred again at room temperature for four hours. The complex is broken by adding 16.8 ml. of ethyl acetate, 5.6 ml. of water, 11.2 ml. of a 15 percent aqueous solution of sodium hydroxide and 16.8 ml. of water, while stirring. The reaction mixture is filtered, the residue is washed with tetrahydrofuran and the filtrate is evaporated to dryness under reduced pressure. The residue is crystallized by dissolving it in 75 ml. of ethyl acetate, cleaning the solution by treatment with a charcoal preparation and diluting it with hexane. The resulting 7-chloro-2-methyl-10,11-dihydro-dibenzo[b,f][1,4]thiazepine is recrystallized from isopropanol, M.P. 121–124°.

To a solution of 7.9 g. of 7-chloro-2-methyl-10,11-dihydro-dibenzo[b,f][1,4]thiazepine in 18 ml. of glacial acetic acid is added 0.9 g. of paraformaldehyde and then dropwise a solution of 1.8 g. of sodium cyanide in 6 ml. of water while stirring and maintaining a temperature of 20°. The reaction mixture is stirred for two hours at room temperature, then heated to 45–50° for two hours and to 55–60° for one hour. After cooling to 35°, 1.5 ml. of water is added; the reaction mixture has room temperature when the solid material is filtered off. The latter is washed with water and recrystallized from methanol to yield 6.0 g. of 7-chloro-10-cyanomethyl-2-methyl-10,11-dihydro-dibenzo[b,f][1,4]thiazepine of the formula:

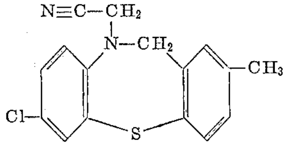

which melts at 88–92°.

*Example 6*

A mixture of 5.4 g. of 10-cyanomethyl-4-methyl-10,11-dihydro-dibenzo[b,f][1,4]thiazepine, 1.8 g. of ethylene diamine and four drops of carbon disulfide is heated for four hours at 110–118°. The reaction mixture becomes crystalline and is diluted with 20 ml. of ethanol. The solvent is evaporated and the residue is dissolved in ethyl acetate. After filtering off some insoluble material, the desired 10-[(2-imidazolin-2-yl)-methyl]-4-methyl-10,11-dihydro-dibenzo[b,f][1,4]thiazepine of the formula:

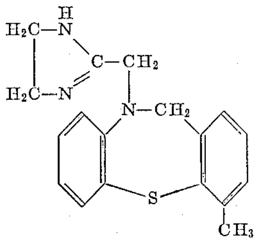

crystallizes, M.P. 143–145°; yield: 4.5 g.

The 10-[(2 - imidazolin-2-yl)-methyl]-4-methyl-10,11-dihydro-dibenzo[b,f][1,4]thiazepine hydrochloride is prepared by dissolving 4.2 g. of the free base in 100 ml. of isopropanol while heating and adding a solution of hydrogen chloride in ethyl acetate; the crystalline salt is filtered off and recrystallized from a mixture of ethanol and ethyl acetate; M.P. 265° (with decomposition).

The starting material used in the above procedure is prepared as follows: To a suspension of 5.6 g. of lithium aluminum hydride in 400 ml. of tetrahydrofuran is added 19.3 g. of 4 - methyl - 11 - oxo - 10,11 - dihydro - dibenzo-[b,f][1,4]thiazepine; the reaction mixture is stirred at room temperature for one hour, refluxed for four hours, and again stirred at room temperature for four hours. The complex is broken as described in Example 5; the resulting 4 - methyl-10,11-dihydro-dibenzo[b,f][1,4]thiazepine melts at 110–112° after recrystallization from isopropanol; yield: 10.5 g.

To a solution of 9.1 g. of 4-methyl-10,11-dihydro-dibenzo[b,f][1,4]thiazepine in 25 ml. of glacial acetic acid are added 1.2 g. of paraformaldehyde and dropwise over a period of 45 minutes and while cooling in an ice bath, a solution of 2.4 g. of sodium cyanide in 8 ml. of water. Stirring is continued for another thirty minutes while cooling, for thirty minutes at room temperature and for 3½ hours at 35–50°. The reaction mixture is allowed to stand overnight at room temperature, and is diluted with about 5 ml. of water. The crystalline 10-cyanomethy - 4 - methyl-10,11-dihydro-dibenzo[b,f][1,4]thiazepine of the formula

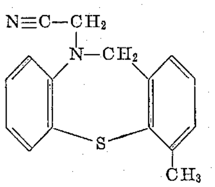

is filtered off, washed with water and recrystallized from ethanol, M.P. 102–104°; yield: 6.0 g.

*Example 7*

The compounds of this invention may be used in the form of compositions. For example, tablets, each containing 0.05 g. of 10-[(2-imidazolin-2-yl) - methyl]10,11-dihydro-dibenzo[b,f][1,4]thiazepine hydrochloride, may be prepared as follows (for 500,000 tablets):

| Ingredients: | G. |
|---|---|
| 10 - [(2-imidazolin-2-yl) - methyl]-10,11-dihydro-dibenzo[b,f][1,4]thiazepine hydrochloride | 25,000.0 |
| Lactose S.D. | 106,845.0 |
| Corn starch | 3,850.0 |
| Corn starch (for paste) | 2,860.0 |
| Confectioners sugar | 10,000.0 |
| Stearic acid | 1,445.0 |
| Purified water, q.s. | |
| 3A alcohol anhydrous, q.s. | |

The 10-[(2-imidazolin-2-yl)-methyl]-10,11-dihydro-dibenzo[b,f][1,4]thiazepine hydrochloride is mixed with an equal portion of lactose; the mixture is passed through a No. 16 screen on a Fitz mill at medium speed and placed into a mixer. The remainder of the lactose, the 3,860.0 g. of corn starch, the confectioners sugar and the stearic acid are added, and the powder is mixed for twenty minutes. The 2,860.0 g. of corn starch is suspended in cold water and a paste is formed by diluting it with 14,000 ml. of boiling water. The paste is added to the dry powder mixture to form the granulate; granulation is completed by adding 1,000 ml. of a 1:1-mixture of the 3A alcohol and water. The wet mass is passed through a No. 5 screen on the Fitz mill at low speed, dried on trays at about 43° and broken on a No. 12 screen. The granulate is compressed into tablets weighing 0.3 g., using 11/32 inch dies and standard concave punches.

Capsules, each containing 0.05 g. of 10-[(2-imidazolin-2-yl) - methyl] - 10,11-dihydro-dibenzo[b,f][1,4]thiazepine hydrochloride may be prepared as follows (for 40,000 capsules:

| Ingredients: | G. |
|---|---|
| 10 - [(2 - imidazolin - 2 - yl) - methyl]-10,11 - dihydro - dibenzo[b,f][1,4]thiazepine hydochloride | 2,000.0 |
| Corn starch | 700.0 |
| Magnesium stearate | 105.0 |
| Lactose | 11,195.0 |

All ingredients are thoroughly mixed; the mixture is passed through a No. 30 screen, again mixed for an additional thirty minutes and then filled on an encapsulating machine into No. 2 clear, hard gelatine capsules, each containing 0.35 g. of material.

What is claimed is:

1. A compound having the formula

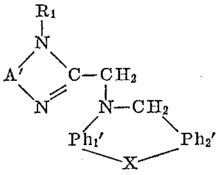

in which each of the groups $Ph_1'$ and $Ph_2'$ stands for a member selected from the group consisting of 1,2-phenylene, (lower alkyl) - 1,2 - phenylene, (lower alkoxy)-1,2-phenylene, (halogeno) - 1,2 - phenylene and (trifluoromethyl) - 1,2 - phenylene, A' stands for alkylene having from two to five carbon atoms and separating the two nitrogen atoms by from two to three carbon atoms, $R_1$ is a member selected from the group consisting of hydrogen and lower alkyl, and X is a member selected from the group consisting of sulfur and oxygen.

2. An acid addition salt of a compound having the formula

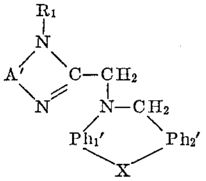

in which each of the groups $Ph_1'$ and $Ph_2'$ stands for a member selected from the group consisting of 1,2-phenylene, (lower alkyl) - 1,2 - phenylene, (lower alkoxy) - 1,2-phenylene, (halogeno) - 1,2 - phenylene and (trifluoromethyl)-1,2-phenylene, A' stands for lower alkylene, having from one to three carbon atoms and separating the two nitrogen atoms by from two to three carbon atoms, $R_1$ is a member selected from the group consisting of hydrogen and lower alkyl, and X is a member selected from the group consisting of sulfur and oxygen.

3. 10-[(2-imidazolin - 2 - yl)-methyl] - 10,11-dihydro-dibenzo[b,f][1,4]thiazepine.

4. 10-[(2-imidazolin-2-yl) - methyl] - 8-methyl-10,11-dihydro-dibenzo[b,f][1,4]thiazepine.

5. 10-[(2-imidazolin - 2 - yl)-methyl] - 10,11-dihydro-dibenzo[b,f][1,4]oxazepine.

6. An acid addition salt of 10-[(2-imidazolin - 2 - yl)-methyl]-10,11-dihydro-dibenzo[b,f][1,4]thiazepine.

7. An acid addition salt of 10-[(2-imidazolin - 2 - yl)-methyl] - 8 - methyl - 10,11 - dihydro-dibenzo[b,f][1,4]-thiazepine.

8. An acid addition salt of 10-[(2-imidazolin - 2 - yl)-methyl]-10,11-dihydro-dibenzo[b,f][1,4]oxazepine.

References Cited by the Examiner

UNITED STATES PATENTS

| | | | |
|---|---|---|---|
| 2,485,212 | 10/49 | Miescher et al. | 260—243 |
| 3,038,896 | 6/62 | Habicht et al. | 260—327 |

FOREIGN PATENTS

| | | |
|---|---|---|
| 551,400 | 3/57 | Belgium. |

OTHER REFERENCES

Protiva et al., Experientia, vol. 13 (1957), pages 291–292.

Yale et al., Jour. Amer. Chem. Soc., vol. 79 (1957), pages 4375–4376.

WALTER A. MODANCE, *Primary Examiner.*

NICHOLAS S. RIZZO, *Examiner.*